United States Patent [19]

Moore

[11] 4,309,123
[45] Jan. 5, 1982

[54] METHOD AND APPARATUS FOR FASTENING MISALIGNED STRUCTURAL MEMBERS

[75] Inventor: Raymond J. Moore, Torrance, Calif.

[73] Assignee: Rajac Corporation, Wilmington, Del.

[21] Appl. No.: 88,612

[22] Filed: Oct. 26, 1979

[51] Int. Cl.³ .................. F16B 5/02; B23Q 3/00; B23P 19/04; B25B 27/14
[52] U.S. Cl. .................. 403/408; 29/240; 29/271; 29/467; 29/526 R; 81/3 R
[58] Field of Search .................. 29/526 R, 464, 467, 29/240, 271; 81/1 P, 3 R, 10; 151/41.7, 41.76; 403/408

[56] References Cited

U.S. PATENT DOCUMENTS

| | | | |
|---|---|---|---|
| 3,006,443 | 10/1961 | Siler | 403/408 |
| 3,099,470 | 7/1963 | Zumbusch | 29/464 X |
| 3,254,690 | 6/1966 | Neuschotz | 29/240 UX |
| 3,289,290 | 12/1966 | Sandor | 29/240 X |
| 3,357,730 | 12/1967 | Siler | 403/408 |
| 3,509,618 | 5/1970 | Siler | 29/240 X |
| 3,590,461 | 7/1971 | Siler | 29/240 |

FOREIGN PATENT DOCUMENTS 1102374  3/1961  Fed. Rep. of Germany ...... 403/408

*Primary Examiner*—Charlie T. Moon
*Attorney, Agent, or Firm*—I. Michael Bak-Boychuk

[57] ABSTRACT

Set out herein is a fastener assembly which, together with a fastening tool may be used to align and secure structural members to each other, the structural members having misaligned securing apertures. Particularly, this invention relates to a device consisting of two eccentric bushings nested and swaged together while still permitting their relative rotation, and a special tool used for their installation. The present invention also relates to the use of the nested eccentric bushings with multiple threaded fasteners and nuts, and spiral cam ended pins with spring retainers to achieve a quick-release attachment. In addition, this invention relates to the retention of the fastener members in the nested bushing assembly and the retention of the bushing assembly in the access panel when the panel is removed. The present invention relates to the use of the nested eccentric bushings in conjunction with standard round shank screws, bolts, platenuts, nuts, washers and other fastener hardware. More particularly, each bushing of an assembly provides a means of indexing the installation tool. The tool holds the fastener and simultaneously rotates each eccentric bushing independently until hole alignment of the mating parts is achieved. Further, at this point, the tool injects the fastener through the hole in the lower structure and is then used to rotate the fastener sufficiently to engage its receptacle.

8 Claims, 18 Drawing Figures

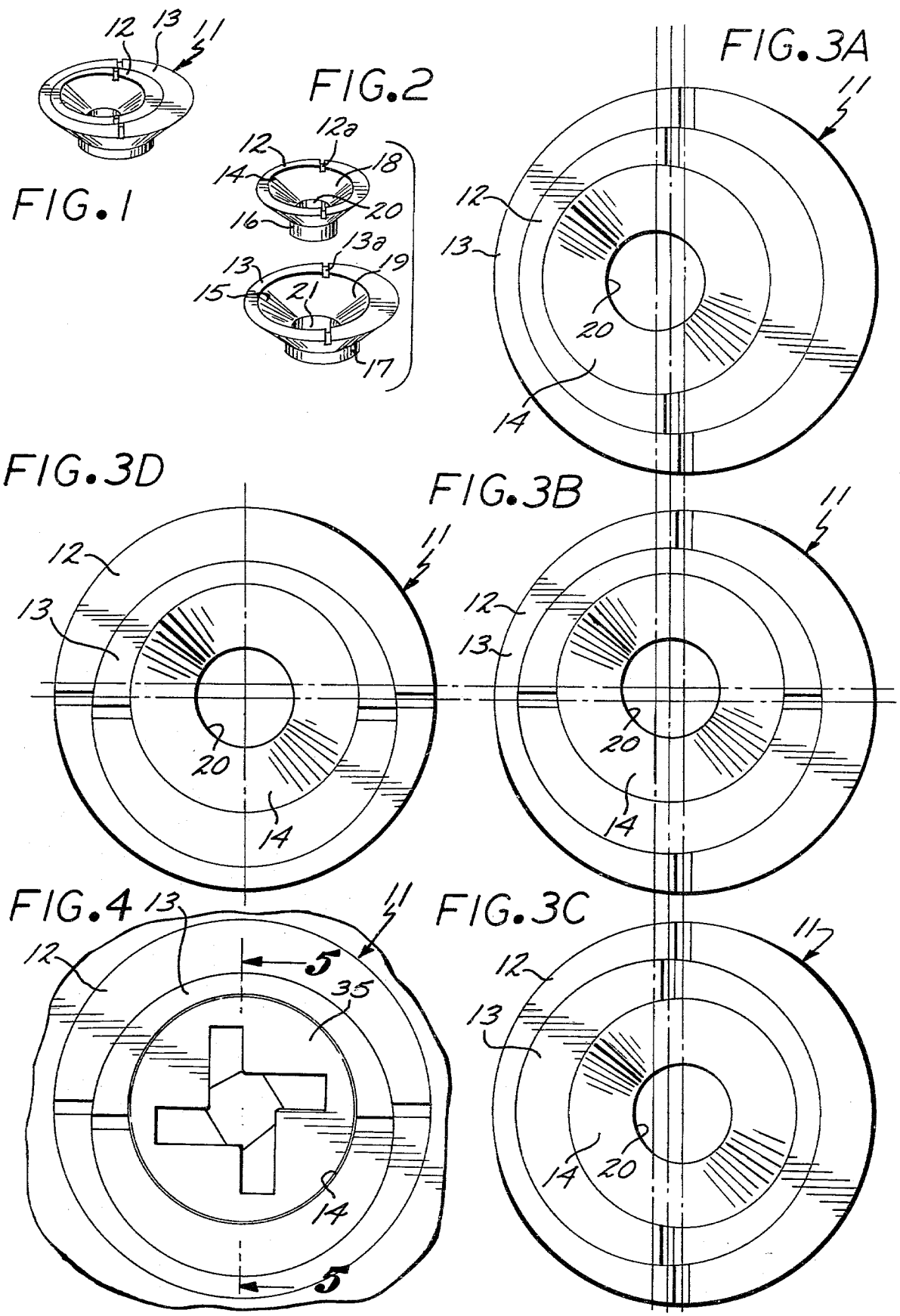

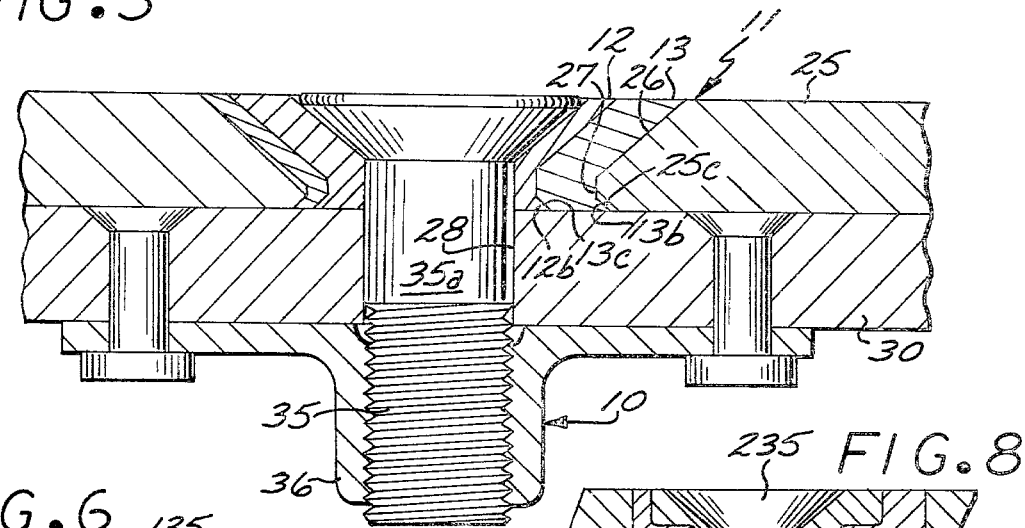
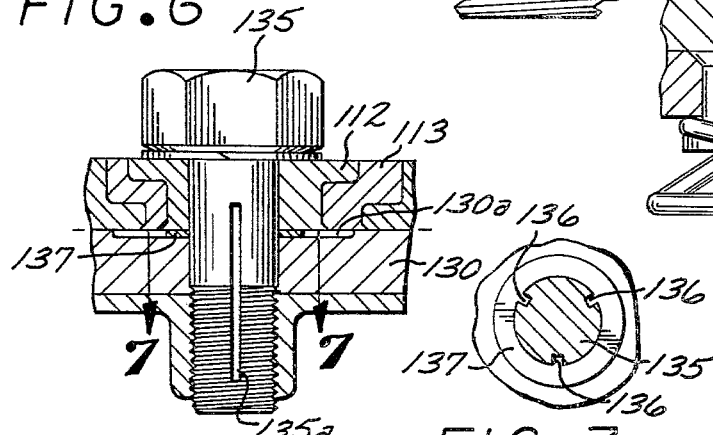
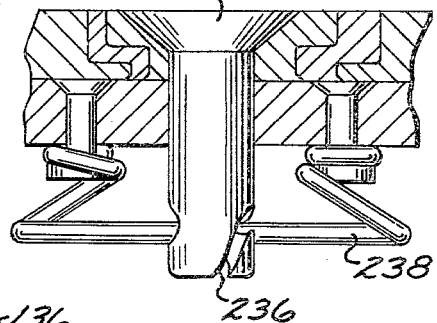
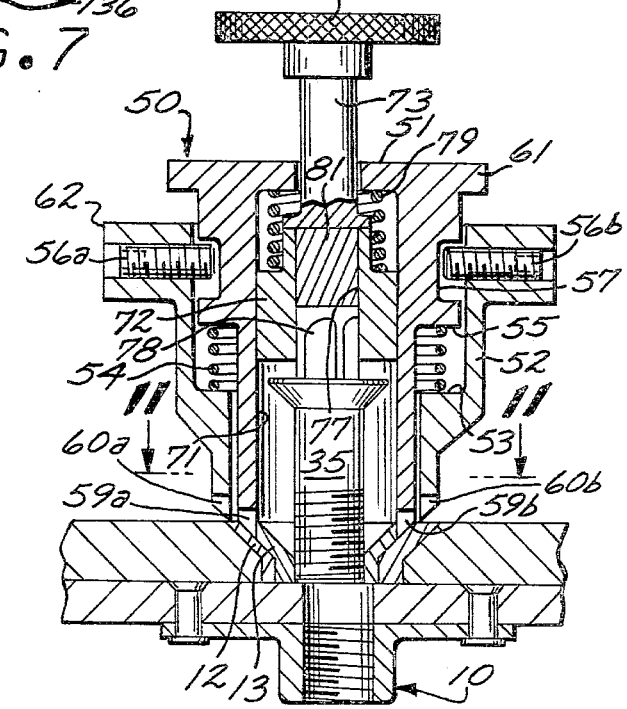

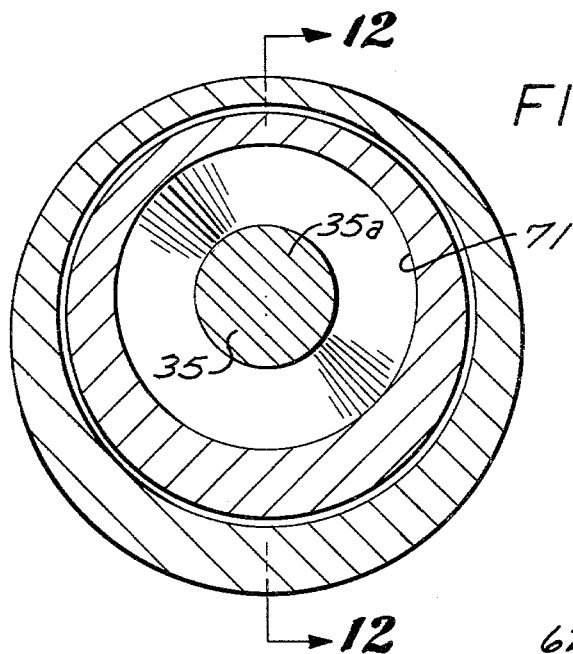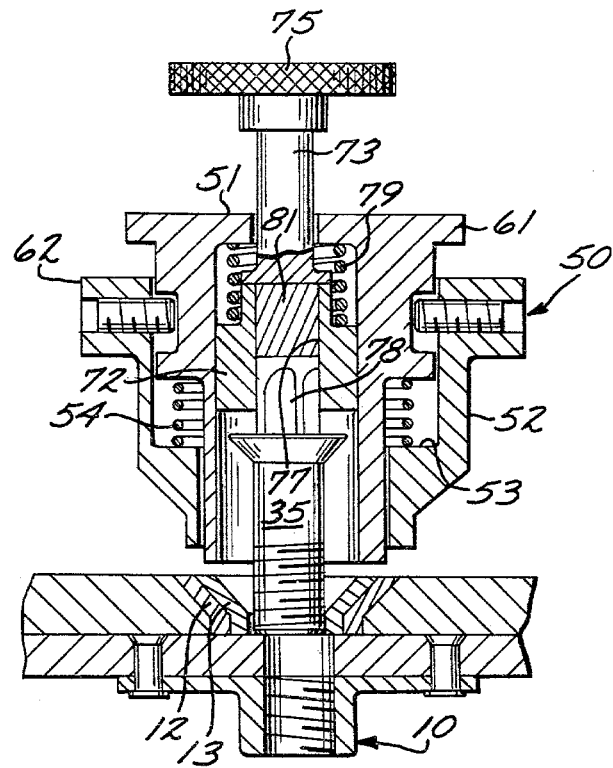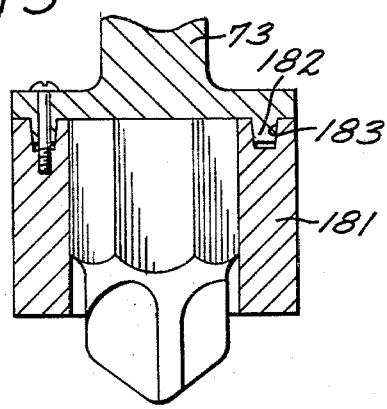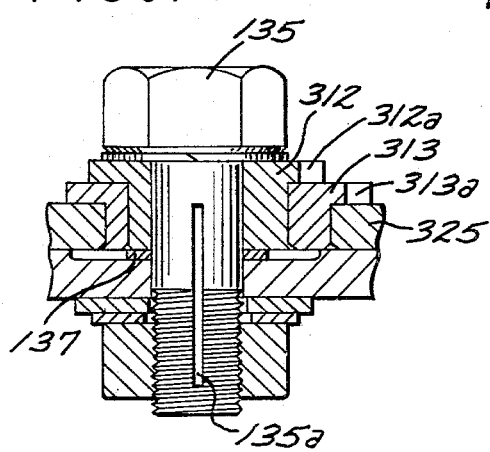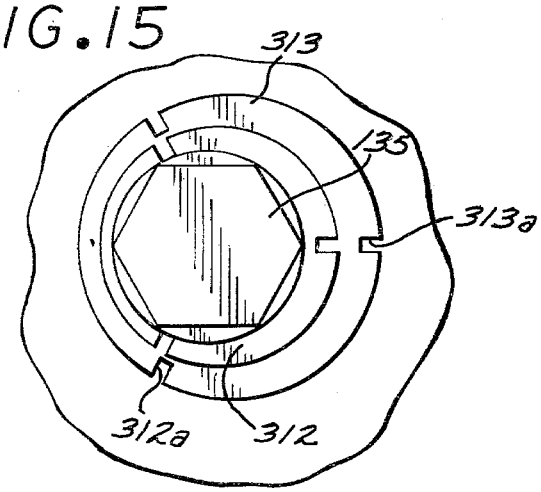

METHOD AND APPARATUS FOR FASTENING MISALIGNED STRUCTURAL MEMBERS

BACKGROUND OF THE INVENTION

1. Field of the Invention

The present invention relates to self-aligning fastening devices and means for installing same.

2. Description of the Prior Art

Since the advent of high performance commercial and military aircraft, the industry has faced the problem of providing rapid access to internally installed equipment for the purpose of inspection, service, maintenance and/or replacement. In doing this the nature of aircraft loads must be considered. The major loads imposed on the structure are those due to flight, landing and handling. In modern aircraft these are carried through the aircraft skin and, using the wing as an example, vary from low near the tip to high near the fuselage.

The constraints imposed on the designer include weight, cost, time and reliability. Historically, he has had to make a choice between two basic methods of handling the loads in the area of the cutout in the skin created by the need for internal access. He may elect to use a thin guage non-stressed panel in conjunction with added internal structure designed and located to carry the primary bending loads around the cutout. This usually takes the form of a machined forging. The removable access panel is light since it carries only local air loads. Oversize holes are used in both the panel and the internal structure. Together with a floating receptacle mounted on the internal structure, this design generally accepts misaligned holes and is usually used with a quick release type fastener. Tooling and labor costs for the panel installation are lower since only non-precision drill fixtures are required. An offset to this is the added cost and weight of the machined forging with its attendant tooling in the form of a forging die and precision milling and drill fixtures. This type of installation is the heavier.

The alternate method is to use an access panel, usually of the same thickness as the surrounding skin, with close fitting holes in both the panel and the internal structure and connected with close tolerance fasteners. These features provide the necessary bearing area and the intimate contact between all the load carrying members necessary to transfer the high shear and bending loads involved. This approach requires master tooling, precision drill fixtures and a high degree of labor skill. This type of installation is the lighter of the two methods and as such, in aircraft, is preferred.

The costs of both types of panel installation are initially about the same. However, when considered in terms of the "Life Cycle Costing" system used by the military in arriving at the total cost of the original acquisition and subsequent support and maintenance of an aircraft fleet over its expected life, usually twenty years, the costs of the stressed access panel become exorbitant. This can easily be explained.

Experience has shown that minute shifting or working of the aircraft structure, when subjected to flight/landing/handling loads, very easily uses up the slight clearance between close fitting fasteners and holes. As an example, using a 0.25 inch diameter screw, the total diametral clearance is $\frac{.0055}{.0005}$ inches.

With fits like this, all too frequently when a panel is removed, the load is relieved and one or more of the fasteners cannot be replaced. The standard repair is to drill the holes out to accept the next larger size fastener. This can usually be done only once for a given hole before running out of acceptable edge distance for the fastener. When this occurs, the usual remedy is to requisition a replacement panel, preferably blank, and completing it on the spot to fit the structure. It is this condition that necessitates the procurement, storage and disbursement of a high percentage of spare access panels for the full life span of the aircraft fleet. It is readily apparent that this is not only expensive in terms of parts, storage facilities, labor and time, but also results in grounded aircraft, useless until they are repaired.

Prior special fastener art in this area, while called high shear fasteners, does not, in most cases, meet the intimate contact criteria referred to herein for high load carrying devices and none can be replaced with a larger version of the same.

The present invention eliminates the basic problem by permitting the original design to accept mating holes in both the access panel and the internal structure that are grossly misaligned either initially or subsequently while retaining intimate contact between all load carrying members.

Objects of the present invention are to:

a. Permit the creation of a high shear, bending, and local tension load attachment between two structural members whose attachment holes are either initially or subsequently grossly misaligned.

b. Permit the use of standard fastener hardware.

c. Achievement of a quick-release capability.

d. Permit fastener installation from one side when necessary.

e. Eliminate the need for master tooling and precision drill fixtures, using instead standard tolerance, low cost drill fixtures.

f. Reduce the personnel skill level required to make the original equipment and maintain it in service.

g. Reduce the man hours required to make the original equipment and maintain it in service.

h. In the case of aircraft, save the cost of forge dies, forgings and machining by using stressed removable panels.

i. In the case of aircraft, reduce the empty weight by using stressed removal panels and use this weight savings to increase any combination of range, payload and performance.

j. In the case of aircraft, eliminate, to a large degree, the need for procurement, storage and disbursement of spare access panels, with the attendant high costs, for the life of the aircraft fleet. This is normally fifteen to twenty-five years.

k. In the case of aircraft, decrease their down time and labor costs caused by removable panels that cannot be satisfactorily replaced without undue effort.

l. Permit the retention of the fastener and nested bushings in the removable panel when it is removed.

m. Provide the means by which a fastener can be installed through a flush surface bushing assembly under adverse conditions.

n. Provide the means by which the eccentrically located holes through a protruding bushing assembly can be brought into alignment for installation of a fastener.

SUMMARY OF THE INVENTION

Accordingly, it is the general purpose and object of the present invention to provide a fastener assembly including nested eccentric bushings which may be turned for mating alignment by way of a spring loaded installation tool.

Other objects of the invention are to provide an aligning fastener assembly adapted for blind insertion.

Yet further objects of the invention are to provide an aligning fastener assembly which can be used both with threaded engagement and with structures adapted for quick release.

Yet additional objects of the invention are to provide an aligning fastener assembly which is easy to produce, convenient in use, and requires very little maintenance.

Briefly, these and other objects are accomplished within the present invention by conforming a fastener assembly to include two eccentric nested bushings each provided with a seat communicating with an eccentric bore. The seat of the exterior nested bushing is conformed to the exterior surface of the interior nested bushing, with the interior bushing including the fastener seat and a bore in eccentric disposition. Thus the rotation of the individual bushings of the nested set once inserted into the fastening hole will eventually achieve an alignment of the central bore which is coaxial with the opening in the structure to be attached to. To accommodate this individual rotation of the two nested bushings each bushing includes indexing slots on the exterior periphery thereof, the slot being exposed to be engaged by an installation tool conformed as two coeccentric sleeves. Each of the sleeves includes edged projections along one edge thereof which are adapted to engage the indexing slots and the sleeves each furthermore include narrow exterior surfaces which may be grasped to achieved rotation.

Received on the interior of the inner sleeve is a spring biased driver extending from the upper end of the installation tool and terminating on the interior in a driving blade conformed to engage a fastener. During the course of installation, while the two eccentric bushings are still misaligned, the edges of the mating opening restrict the inward passage of the fastener. Once the two eccentric bushings are manipulated to align the fastener with the mating hole, the spring bias of the driver advances the fastener indicating completed alignment. At this point the fastener may be advanced into engagement with either a nut-type device on the other side of the mating hole or any quick release device and the tool may be removed to be used for further attachment.

By way of the foregoing arrangement of parts close tolerances can be held between the shank of the fastener and the orifice in the nested bushings together with a close tolerance with the mating hole. Thus load transfers can be accommodated through the fastener structure, the nesting of two eccentric bushings allowing for full accommodation of any misalignment. The user, furthermore, does not have to visually inspect the alignment of the holes, the eccentric alignment being simply accomplished in the blind by the manipulation of the two sleeves of the installation tool.

A typical difficult installation would be an access panel that had to be installed by one man on the lower surface of an aircraft wing. One hand would be required to hold the panel up in position. Simultantous but independent rotation of each eccentric bushing, until the holes are aligned, followed by insertion of the fastener through the inner member and its rotation until it is engaged, must be done by the other hand using the tool. The tool consists basically of two telescoped sleeves provided with external knurled rings to facilitate rotation. The inside sleeve contains a magnetized tip to engage and hold the top of the fastener. This assembly is spring loaded to push the fastener into place when the holes are aligned. The inside sleeve is first rotated until it picks up the indexing features on the inner eccentric bushing. After this occurs, the outside sleeve is rotated until it engages the outer eccentric bushing. Following this, both sleeves are rotated relative to each other in a random manner until the holes are aligned. This will be apparent when the spring loaded fastener is pushed into position. At this point, the top knurled ring is rotated until the fastener engages its receptacle. In the case of threaded fasteners, final run up and torquing is done after all the panel fasteners are in place.

BRIEF DESCRIPTION OF THE DRAWINGS

FIG. 1 is a perspective illustration of a nested bushing assembly useful with the invention herein;

FIG. 2 is yet another perspective illustration of the nested bushing assembly shown in FIG. 1, illustrating the parts thereof in separated state;

FIGS. 3a–3d are top views of the nested flush-type bushing assembly illustrating the various alignments thereof;

FIG. 4 is yet another top view illustrating the alignment of the bushing assembly in receiving engagement with the fastener;

FIG. 5 is a side view in section taken along line 5—5 of FIG. 4;

FIG. 6 is yet another side view, in section, illustrating an alternative implementation of the invention set out herein;

FIG. 7 is a top view, in section, taken along line 7—7 of FIG. 6;

FIG. 8 is a further embodiment of the self-aligning fastener disclosed herein illustrating the adaption thereof for one of various quick release attachments;

FIG. 9 is a perspective illustration of an installation tool useful with the invention herein;

FIG. 10 is a sectional view of the installation tool, taken along line 10—10 of FIG. 9;

FIG. 11 is a top view, in section, taken along line 11—11 of FIG. 10;

FIG. 12 is yet another side view, in section, of the installation tool, illustrating the disposition of a fastener before engaging alignment thereof;

FIG. 13 is a detail view of yet another implementation of a tool bit retainer useful herein;

FIG. 14 is a side view, in detail, illustrating a further alternative implementation of a fastening arrangement according to the present invention; and FIG. 15 is a top view of the implementation shown in FIG. 14.

DESCRIPTION OF THE PREFERRED EMBODIMENT

As shown in FIGS. 1, 2 and 5, the invention self-aligning fastener, generally designated by the numeral 10, includes a set of nested bushings 11 comprising an interior bushing 12 and an exterior bushing 13. Bushings 12 and 13 are generally conformed to include conical segments, bushing 12 having a conical segment 14 and bushing 13 having a conical segment 15. Each of the conical segments end at the narrower end thereof in a cylindrical section shown herein as cylindrical sections 16 and 17 respectively. In the foregoing implementation the interior bushing 12 within the conical segment 14 includes an eccentrically aligned conical seat surface 18 terminating in an eccentric bore 20 extending through the cylindrical section 16. Thus the common axis extending through the conical seating surface 18 and the bore 20 is offset relative the central axis of the cylindrical segment 16 and the conical section 14. The exterior surfaces of the conical section 14 and the cylindrical section 16 are in turn received respectively in a conical seat surface 19 and a bore 21, once more, eccentrically formed within the exterior eccentric bushing 13. In order to maintain the nested bushings as an integral assembly the interior bushing 12 may include an extended lower exterior edge 12b swaged onto a corresponding chamfer 13c formed in bushing 13.

As shown in FIGS. 3a-3d, this eccentric arrangement allows for complete manipulation of the bore 20 relative to the alignment of the exterior eccentric bushing 13. Similarly, the alignment of the exterior eccentric bushing 13 within any plate 25 can be manipulated by the rotation of the eccentricity thereof, the combination of the eccentric manipulation of the interior bushing 12 and the exterior bushing 13 resulting in a full coverage of the tolerance ranges accommodated within the eccentric offsets. For this reason the attached plate 25 also includes a conical chamfer 26 formed around the exterior edge of a mounting hole 27. This mounting hole 27 may then be aligned over a hole 28 formed in the structure to which plates 25 is attached to, this structure being shown herein as a structural plate 30. The structural fastener, shown herein by way of a machine screw 35, may then be inserted into the interior of bore 20 and the opening 28 to attach or threadably engage a nut plate 36 or other retaining device on the other side of the structural support plate 30. Bushing 13, similar to bushing 12, may include an extended lower edge 13b which is swaged against a proximate chamfer 25c in plate 25. In this manner the nested bushings are retained in plate 25 in an arrangement which still permits the rotation thereof.

It is to be understood that for purposes of load transfer the opening 28 may be sized for mating fit with the shank 35a of the fastener 35, the load transfer into plate 25 being achieved by a conforming fit of the same fastener on the interior of the eccentric bushing 12. To align the eccentric interior of bushing 12 and concurrently the alignment of bushing 13 within the seating geometry in plate 25, each of the bushings includes indexed slots 12a and 13a, respectively, formed in the exposed surface thereof which may be engaged by an indexing installation tool according to the description following.

As shown in FIGS. 9-12, a tool assembly useful for aligning the foregoing eccentric nested bushings is generally designated by the numeral 50 and comprises two cylindrical sleeve-like structures set out herein as an inner sleeve assembly 51 and an outer sleeve assembly 52. Sleeve 52 is substantially annular in section and is conformed to receive on the interior thereof sleeve assembly 51. To provide for a spring bias, sleeve assembly 52 includes a reduced diameter section formed proximate the lower edge thereof which is achieved by way of a shoulder 53 supporting a spring 54. The other end of spring 54 abuts against an enlarged shoulder 55 formed on the interior sleeve assembly 51, and it is between these shoulders that an outwardly directed bias is achieved in the use of spring 54. The outward progression of sleeve assembly 51 out of the interior of sleeve assembly 52 is limited by way of several opposed set screws 56a and 56b which project into the annulus of the exterior sleeve assembly to extend into a peripheral groove 57 formed around the exterior of sleeve assembly 51. It is contemplated to form this peripheral groove 57 to a size sufficient to allow the telescoping translation of the inner sleeve assembly within the outer sleeve assembly such that the bottom edges thereof may be selectively extended. Formed on these bottom edges and more specifically on the bottom edge of sleeve assembly 51 are two spaced key projections 59a and 59b which are shaped to be received in the aforementioned indexing slot 12a on the upper surface of the inner eccentric bushing 12. Similarly the bottom edge of the sleeve assembly 52 is provided with two key projections 60a and 60b, once more conformed for insertion into the index slots 13a on the upper surface on the exterior eccentric bushing 13. In this form the installation tool assembly 50 may be placed over the exposed edges of the nested bushing assembly 11 and the individual sleeves may be manually turned until engagement occurs between the key projections at the edges thereof and the respective indexing slots. This turning may be achieved by way of exposed mold strips 61 and 62 respectively formed around the exposed peripheries of sleeve assemblies 51 and 52. Formed on the interior of the sleeve assembly 51, furthermore, in an eccentrically aligned annular cavity 71 in which a plunger 72 is rotatably and slidably received. This plunger 72 is connected to a cylindrical handle 73 which extends to the exterior of the sleeve assembly 51 at the upper surface thereof. On the exterior, handle 73 connects to yet another knurled knob 75 through which the plunger may be turned. The plunger 72 includes a keyed receiving slot 77 on the inside thereof in which a magnet and a screw driver head or other turning tool 78 may be received. It is this turning tool that engages the normally found serrations at the top surface of the fastener 35 and it is by way of this tool that the fastener is engaged to the standard or quick release device. In order to assist the search for the alignment of the two nested bushings there is a spring bias provided by way of a spring 79 extending from the upper surface of plunger 72 and abutting the interior edge of the sleeve assembly 51. Thus, as the installation tool assembly 50 is first loaded with the fastener the fastener magnetically retained is then inserted into the eccentric bore 20 of the inner bushing 12. Spring 79 is then compressed, compressing the fastener against the off-set or misaligned edge of opening 28. The user indexes the inner and outer tool sleeves in the bushings by rotating each sleeve separately until they engage the indexing slots in the bushings and then randomly turns both the exterior and the interior sleeve assemblies until the fastener, through the spring bias thus exerted, drops into the opening 28. At this point the knob 75 may be used to advance the fastener into engagement in the nut plate or other retaining device and the tool may be removed to be used in the next fastener opening. In each instance, blind or random manipulation of the two knurled edges on the sleeve assemblies will eventually achieve the necessary alignement of the bore 20 with the opening 28. Once so aligned, close tolerances can be maintained between the shank of the fastener 35 and the structure secured, thus permitting load transfer thereacross.

As shown in FIGS. 6 and 7 the foregoing structure may be variously modified to accommodate other fastening techniques. More specifically, as shown in FIG. 6, a bolt 135 may be similarly aligned by way of two nested bushings 112 and 113, bushings 112 and 113 in this instance entailing circular eccentric shoulders rather than conical surfaces. Bushings 112 and 113 may include swaged edges, similar to bushings 12 and 13, which retain the bushing assembly in the plate. Bolt 135 may be provided with longitudinal grooves 135a extending over a part of the shank thereof in which interiorly directed tabs 136 of a washer 137 are received. In this manner the fastener is also retained in the plate, precluding inadvertent loss. The structure 130 which receives this fastener may include a circular recess 130a which accommodates the foregoing washer 137 to allow for direct structural contact between the structure and the mounted plate. This same structural arrangement may be used, together with a chamfer on the interior of bushing 112 to align a quick release fastener as shown in FIG. 8. More specifically, as shown in this figure, a quick-release fastener 235 is provided with a spiral cam on the inserted end thereof, shown as groove 236, which is conformed to engage a spring or wire 238 extending on the underside of the secured plate.

The tool assembly 50 may be conveniently adapted to accommodate the foregoing alternative bushings and to operate on standard or special fastener ends by the simple expedient of selecting an appropriate bit insertable into the slot 77 therein. The foregoing tool assembly is further described according to the illustrations in FIGS. 11 and 12. In tight installation arrangements the eccentric tool sleeves may be required to keep the driver centered over the fastener as the fastener moves within the limits permitted by the nested bushings. In installation arrangements which allow for large exposed surfaces of the nested bushings, a fully concentric implementation of tool assembly 50 is possible since radial motion within slots 12a and 13a can occur. Thus assembly 50 may be eccentric or circular, depending on the size of the exposed slots and the strength of the tool material selected.

In the course of the foregoing description the means for retaining the driving tool have not been handled at length. While various fasteners may be installed pursuant to the foregoing description, magnetic retention of interchangeable driving bits is particularly useful. Thus as shown in FIGS. 10 and 12 a magnet 81 may be inserted into the interior of cavity 77 and it is this magnet that holds the bit in place. The same magnetic forces extend into the fastener, thus retaining the fastener for insertion. Alternatively, as shown in FIG. 13, cavity 77 may be formed by way of a magnetic skirt 181 fixed to the driver handle 73 made of a ferrous material by way of bare intimate contact between a circular bead 182 inserted in a groove 183. The magnetic skirt and the ferrous driver handle combine to form a magnetic loop which is completed through the tool bit. Since in each instance only small starting forces are applied to the fastener by the tool assembly 50, little torsional strength is required.

In further alternative the structure shown in FIGS. 14 and 15 may be utilized. In this implementation two nested bushings 312 and 313 are swaged to each other and to a mounting plate 325. Each bushing is once more eccentric including a lateral flange provided with radial cutouts 312a and 313a which can be manipulated with any sharp tool like a screw driver or with the tool assembly 50, depending on the size selected. The fastener centered thereby may be constructed like that shown in FIGS. 6 and 7, rendering a convenient, self-engaged assembly.

Obviously many modifications and changes may be made to the foregoing description without departing from the spirit of the invention. It is therefore intended that the scope of the invention be determined solely on the claims appended hereto.

What is claimed is:

1. Apparatus for attaching one structural member to another wherein said one structural member includes a first fastener opening and said another structural member includes a second fastener opening adapted for alignment subjacent said first fastener opening comprising:
    a set of eccentrically nested bushings including an interior bushing having a fastener bore formed therein in eccentric alignment relative a first circular exterior surface thereof and an exterior bushing having a second circular exterior surface conformed for receipt in said first fastener opening and seating surface on the interior thereof eccentrically aligned relative said second circular exterior surface, said seating surface being conformed to mate with said first exterior surface on said interior bushing said interior and exterior bushings including turning means for aligning the eccentrication thereof relative said first fastener opening, said nested bushings each include exposed edges provided with engaging structures for the independent manipulation thereof, said interior bushing is axially retained within said exterior bushing, and said exterior bushing is axially retained within said first fastener opening by swaging;
    a fastener conformed for insertion in said fastener opening bore and adapted to extend through said second fastener opening upon the eccentric alignment of said interior and exterior bushings within said fastener opening; and
    fastener engaging means attached to said another structural member for engaging the inserted end of said fastener.

2. Apparatus according to claim 1, further comprising:
    said fastener including longitudinal grooves; and
    a washer adapted to engage said longitudinal grooves for limiting the axial motion of said fastener in said interior bushing.

3. Apparatus for aligning two eccentric nested bushings seated in a first structural member relative an attachment opening in a second structural member to allow the insertion of a fastener through the common interior thereof, comprising:
    a first tubular sleeve having an interior bore eccentrically disposed relative the exterior thereof and including first engaging means on one end thereof for engaging in rotation the exterior one of said nested bushings;
    a second tubular sleeve telescopically received in said interior bore of said first tubular sleeve including an eccentric cavity therein, said second tubular sleeve including second engaging means on one end thereof for engaging in rotation the interior one of said nested bushings;

a fastener driver assembly received on the interior of said cavity and conformed to releasably engage said fastener, said driver assembly extending to the exterior of said second sleeve for manipulation thereof;

first spring means deployed between said first and second sleeves for advancing said second sleeve out of said first sleeve; and second spring means deployed between said second sleeve and said driver assembly for advancing said driver assembly towards said one end of said second sleeve.

4. Apparatus according to claim 3 wherein:
said driver assembly includes a magnetic seat for retaining a driver on the interior of said cavity.

5. Apparatus according to claim 4 wherein:
said driver is conformed for engagement with said fastener.

6. Apparatus according to claim 5 wherein:
said first and second sleeves and said driver assembly include exposed knurled surfaces for manipulation thereof.

7. Apparatus according to claim 6 wherein:
said nested bushings each include edge deformations exposed to be engaged by projections formed on the one ends of said first and second sleeves.

8. A method for aligning the interior bore of two eccentric nested bushings in one structural member in coaxial alignment with a circular fastener opening formed in another structural member comprising the steps of:

inserting said nested bushings into said one structural member;

inserting a fastener into the interior of an installation tool having an exterior and interior sleeve in telescoping arrangement;

engaging the exterior one of said nested bushings by said exterior sleeve;

engaging the interior one of said nested bushings by said interior sleeve; and manipulating said interior and exterior sleeves in rotation until said fastener drops into said fastener opening.

* * * * *